Oct. 21, 1930. M. F. WATERS 1,779,023
OIL AND GAS SEPARATOR
Filed Dec. 26, 1928 2 Sheets-Sheet 2

Inventor
M. F. Waters,
By George A. Prevost,
Attorney

Patented Oct. 21, 1930

1,779,023

UNITED STATES PATENT OFFICE

MILLARD F. WATERS, OF TULSA, OKLAHOMA, ASSIGNOR TO SMITH SEPARATOR COMPANY, OF TULSA, OKLAHOMA

OIL AND GAS SEPARATOR

Application filed December 26, 1928. Serial No. 328,563.

My invention consists in new and useful improvements in oil and gas separators, and has for its object to provide an apparatus whereby the operator may handle large volumes of oil and gas with a more complete separation of the particles.

Another object of my invention is to provide an inlet baffle which will deflect the mixture of oil and gas downwardly, and at the same time cause a centrifugal action to take place in the tank. It has been my experience that with this particular arrangement of inlet baffle, the foaming of the oil inside the separator is eliminated to a large extent.

A still further object of my invention is to provide a series of separating baffles within the tank, which will divide the gas into small streams, and at the same time effect a circular downward and upward scrubbing action of said gas on the contact surfaces of the baffles, thus causing any particles of oil which may be entrained in said gas, to be knocked back and conveyed to the bottom of the tank.

With the above and other objects in view which will appear as the description proceeds, my invention consists in the novel features herein set forth, illustrated in the accompanying drawings, and more particularly pointed out in the appended claims.

Referring to the drawings, in which numerals of like character designate similar parts throughout the several views, Fig. 1 is a sectional view of the upper portion of my improved separator tank, showing the relative location of the baffles therein.

Figure 3:
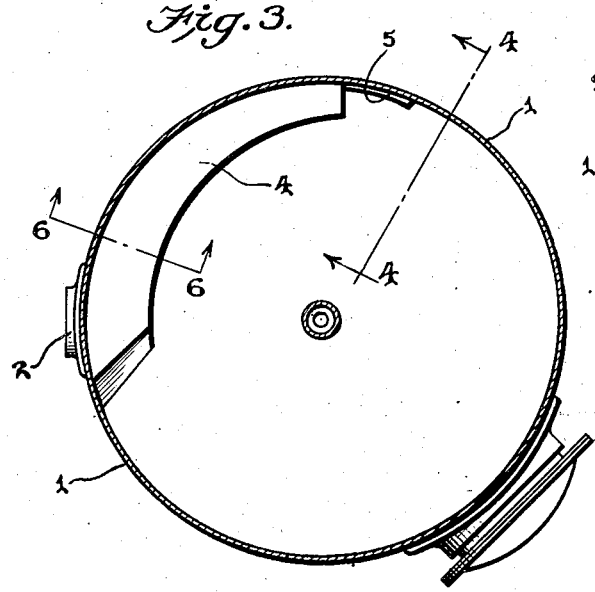
Fig. 3 is a view taken on line 3—3 of Fig. 1, showing the inlet spiral baffle from the upper side.

In the drawings, 1 represents a separator tank, which is cylindrical in shape, and provided with an oil and gas inlet aperture 2, substantially midway of its extremities, and at its upper end, with a gas outlet 3. Adjacent the inlet aperture 2, and secured to the inner wall of the tank 1, by any suitable means, is a spiral inlet baffle 4, which, at its upper or inlet end, is substantially square in cross section, extending downwardly in a spiral form in juxtaposition to the inner wall of the tank 1. This baffle 4 is laterally tapered from its squared inlet end, and is vertically flared toward its discharge end, as clearly shown in Fig. 1 of the drawings, thus being gradually elongated and narrow at its lower end. The outer wall of the baffle 4, adjacent the wall of the tank 1, projects beyond the other walls of said baffle at its lower end, as at 5, said projection becoming gradually thicker and curving inwardly toward the center of the tank, as shown in Fig. 3, whereby the incoming mixture of oil and gas is started in a circular motion toward the center of the tank and away from the shell of said separator, thus preventing said mixture which usually carries a quantity of sand, from eating away the walls of the tank at this point.

Figure 6:
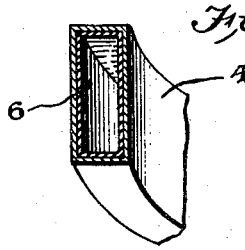
Fig. 6 is a sectional view taken on line 6—6 of Fig. 3, showing the lining of the spiral inlet baffle.

In order to prevent the errosion of the interior of the baffle 4, I may provide the same with a lining of rubber or other suitable material 6, as clearly shown in Fig. 6 of the drawings. It is well known that rubber is a good resistance against errosion, but it has been difficult to develop a rubber that is not soluble in petroleum products. However, such a composition has now been produced, and is particularly adaptable for this baffle lining.

Immediately above the spiral inlet baffle 4, I provide a series or nest of conical baffles 7 and 8, with their apexes extending downwardly, and their upper extremities rigidly secured within a jacket 9, which is inserted within the tank 1, said jacket being of slightly less diameter than said tank and flaring outwardly as at 10, at its lower extremity, whereby said jacket and suspended conical baffles are secured in place within the shell by welding or other suitable means 11. The baffles 7 and 8 are alternately arranged within the jacket 9, and are maintained in their proper positions by spacers 12, said baffles being of two different types. Each baffle 7 is provided with a substantially rectangular perforated section 7ª on one side near the upper edge, while each baffle 8 is imperforate, with the exception of an enlarged aperture 8ª near its apex and on the side opposite to the perforated section 7ª of the baffles 7, as clearly shown in Fig. 2. The perforations 7ª may be formed with upwardly projecting lips, as shown in my prior Patent No. 1,511,854.

Figure 2:
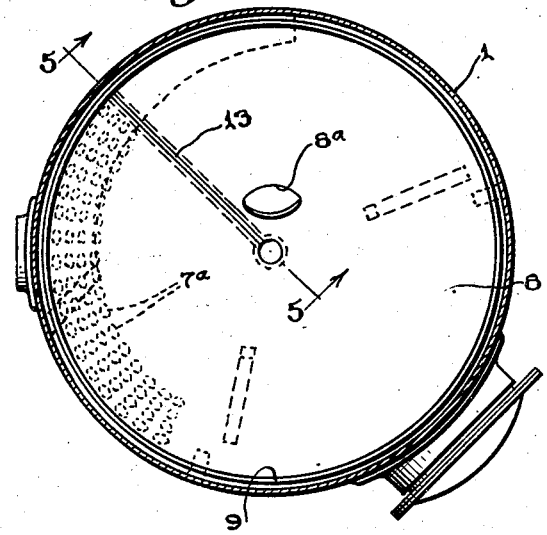
Fig. 2 is a view taken on line 2—2 of Fig. 1, showing the construction of my improved conical baffles.
Figure 4:
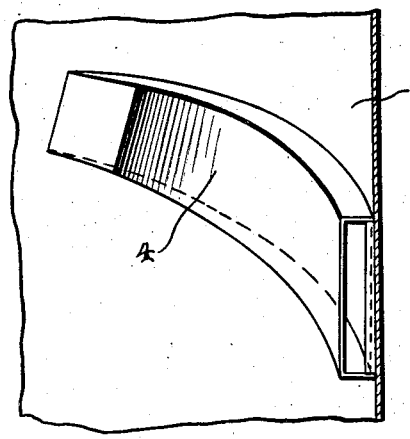
Fig. 4 is a sectional view taken on line 4—4 of Fig. 3, showing the inlet baffle from another angle.
Figure 5:
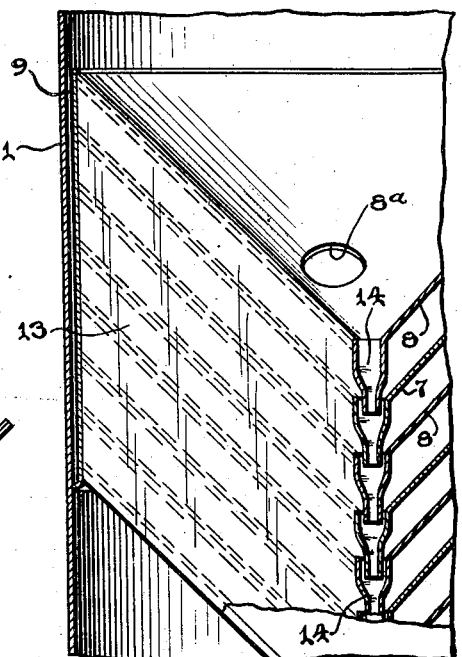
Fig. 5 is a sectional view taken on line 5—5 of Fig. 2.

13 represents a substantially vertical baffle or wall which extends through one side of the baffles 7 and 8, from the centers of said baffles to one wall of the jacket 9, separating the perforated sections 7ª of the baffles 7 from the apertures 8ª of the baffles 8, as clearly shown in Figs. 2 and 5.

Figure 1:
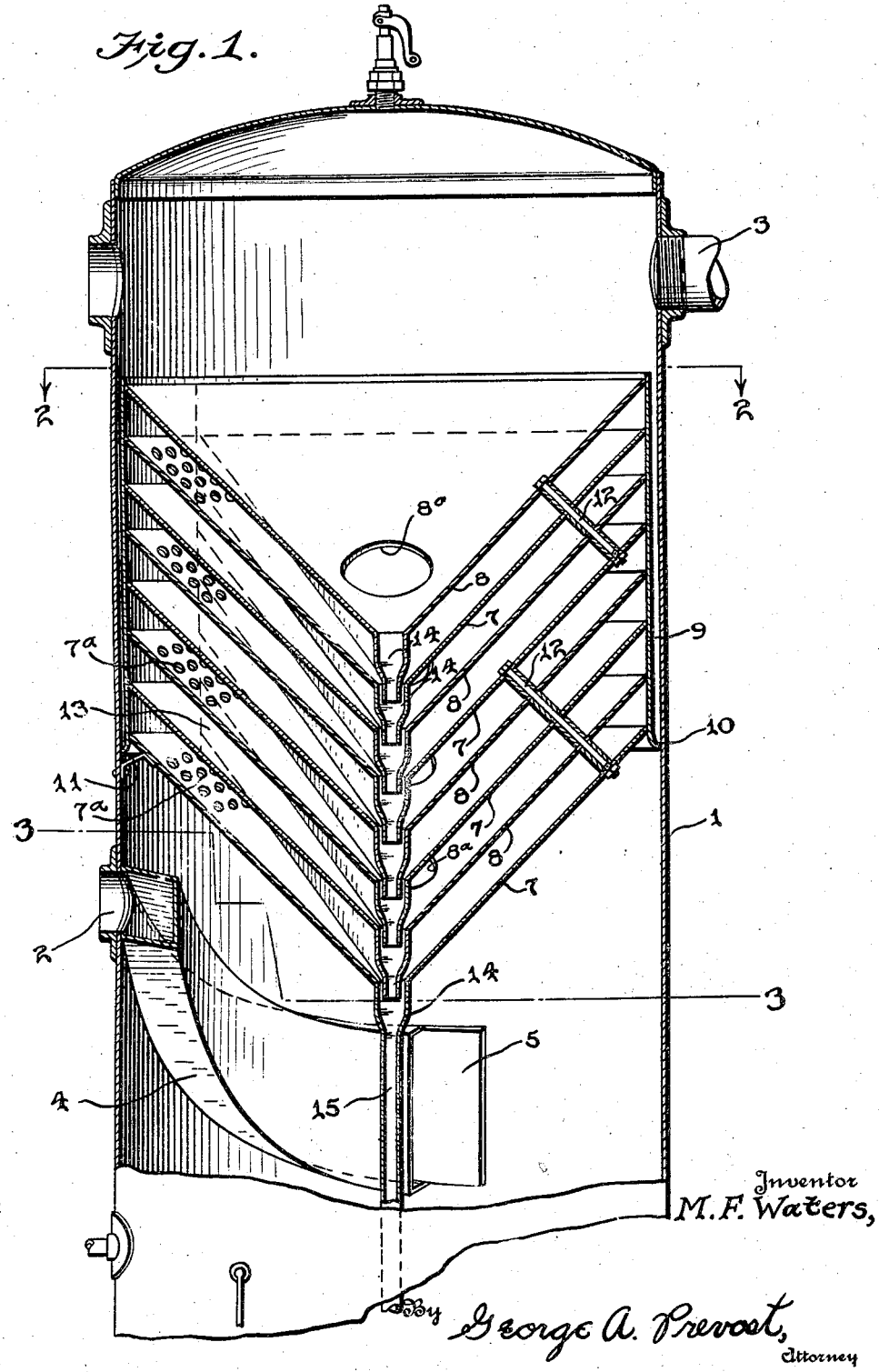

The apexes of the baffles 7 and 8 terminate in drain nozzles 14, each of which extends downwardly and projects into the upper end of the nozzle below, as clearly shown in Fig. 1, each of said nozzles being reduced at its lower end, whereby it is spaced apart from the adjacent nozzle to allow the oil which is knocked back from the under surfaces of the baffles 7 and 8, to drain downwardly therethrough. The lowermost nozzle 14 terminates in an oil drain pipe 15, which conveys the oil to the bottom of the tank.

It will be noted that in the construction of my improved oil and gas separator, I am not limited to any predetermined number of baffles 7 and 8, this being dependent upon the grade of the mixture to be separated, and the surrounding conditions. It will also be noted that if desired, a plurality of inlet baffles 4 may be employed.

Having thus described the construction and assembly of my improved oil and gas separator, its operation is as follows:

The mixture of oil and gas from the well enters the tank 1 at the inlet 2, and is deflected downwardly in a centrifugal motion by the spiral inlet baffle or baffles 4, from whence the oil drops to the bottom of the tank, and the gas rises therein. The gas which at this time has a quantity of oil entrained therewith, immediately comes in contact with the lowermost spiral baffle 7, and is upwardly scrubbed along the under surface thereof, passing upwardly through the perforated section 7ª, where it is divided into a series of small streams. It then comes in contact with the under side of the imperforate baffle 8, and that portion of the vertical baffle 13 between said baffles 7 and 8, which makes a positive seal between said baffles. Hence, said gas is caused to travel around the under surface of the baffle 8, in a direction away from the baffle or wall 13, during which travel it is caused to be scrubbed through a circular downward movement, until it reaches the aperture 8ª in the baffle 8. Then, having been further denuded of its oil content, by this baffle arrangement, the gas passes upwardly through said single aperture 8ª which unites the divided streams. This course is repeated as the gas travels throughout the remainder of the series of baffles 7 and 8.

The particles of oil which have been knocked back by the series of baffles, are conveyed to the bottom of the tank by means of nozzles 14, and the drain pipe 15, while the gas, free from oil, passes out of the tank at 3, and is conducted away by a suitable pipe line.

It is obvious that the gas outlet pipe may extend within the tank, as shown in my copending application Serial No. 141,350.

From the foregoing it is believed that the construction, operation and advantages of my invention may be readily understood, and I am aware that various changes may be made in the details disclosed, without departing from the spirit of the invention, as expressed in the appended claims.

What I claim and desire to secure by Letters Patent is:

1. In an oil and gas separator tank, a series of superposed conical baffles spaced apart and provided with perforated and imperforate sections, said baffles being alternately arranged so that the perforated sections of each baffle are adjacent the imperforate sections of the next occurring baffle, and a substantially vertical wall extending through a portion of said baffles for sealing the spaces therebetween and preventing direct communication between the perforated sections of adjacent baffles.

2. In an oil and gas separator tank, a series of baffles consisting of a plurality of vertically spaced conical baffle members, alternately provided with a section comparatively minutely perforated, and a single opening, said baffles being so arranged that the perforated sections of one set of baffles are adjacent the imperforate portions of the next occurring baffles and the single openings in the last named baffles are adjacent the imperforate portions of the first named baffles, and a substantially vertical wall extending through a portion of said baffles for sealing the spaces therebetween and preventing direct communication between the perforated sections and single openings of adjacent baffles.

3. In an oil and gas separator tank having an oil and gas inlet, an inlet baffle for imparting a centrifugal motion to the mixture being treated, consisting of a substantially spiral trough-like member having an inlet opening at one end adjacent the inlet of said tank, and a discharge opening at the other end, at a point beneath said inlet opening, means at the discharge end of said inlet baffle for deflecting the incoming mixture away from the shell of said tank, a series of super-posed baffles above said inlet baffle, and means for causing the gas to follow a broken path through said series of baffles.

4. Apparatus as claimed in claim 3 wherein the wall of said trough-like member, adjacent the shell of said tank, is elongated at its discharge end and adapted to deflect the incoming mixture away from said shell.

5. In an oil and gas separator tank, a series of super-posed conical baffles arranged in spaced relation with their apexes depending downwardly, each alternate baffle being provided with a comparatively minutely perforated section and the adjacent baffle with a single opening, said perforated sections being located near the upper extremity of the baffles and the single opening in close proximity to their apexes, a substantially vertical wall extending through one side of said baffles for preventing direct communication between the perforated sections and single openings of adjacent baffles, each of said apexes terminating in a drain nozzle in communication with the drain nozzle of the baffle next below, and a drain pipe connected to the lowermost of said nozzles for conveying oil to the bottom of said tank, said baffles being rigidly secured within a supporting jacket which is fixed to the shell of said tank, the baffles being alternately arranged in said jacket with the perforated portion of each adjacent the imperforate portion of the next occurring baffle.

In testimony whereof I affix my signature.

MILLARD F. WATERS.